United States Patent [19]
Benoliel et al.

[11] Patent Number: 5,696,682
[45] Date of Patent: Dec. 9, 1997

[54] AUTOMATIC DRIVER SYSTEM AND A METHOD OF GENERATING AN ACCELERATION REFERENCE

[75] Inventors: Serge Benoliel, Paris; Stéphane Feray-Beaumont, St. Arnoult en Yvelines; Babak Dehbonei, Epinay sur Seine, all of France

[73] Assignee: GEC Alsthom Transport SA, Paris, France

[21] Appl. No.: 547,777

[22] Filed: Oct. 25, 1995

[30] Foreign Application Priority Data

Oct. 26, 1994 [FR] France .................................. 94 12818

[51] Int. Cl.$^6$ .................................................. B60K 31/00
[52] U.S. Cl. ........................................................... 364/426.01
[58] Field of Search .......................... 364/426.01, 426.02, 364/426.03, 426.04, 426.05; 180/244; 246/182 B

[56] References Cited

U.S. PATENT DOCUMENTS

| | | | |
|---|---|---|---|
| 3,655,962 | 4/1972 | Koch | 246/182 B |
| 4,270,716 | 6/1981 | Anderson | 246/182 B |
| 4,384,695 | 5/1983 | Nohmi et al. | |
| 5,018,689 | 5/1991 | Yasunobu et al. | 246/182 B |
| 5,109,343 | 4/1992 | Budway | 364/426.05 |
| 5,205,622 | 4/1993 | Gee | 303/113.2 |
| 5,249,013 | 9/1993 | Demura et al. | 354/404 |
| 5,424,948 | 6/1995 | Jordan, Jr. | 364/426.03 |
| 5,463,550 | 10/1995 | Körber et al. | 364/426.01 |

FOREIGN PATENT DOCUMENTS

| | | |
|---|---|---|
| 0092832A3 | 11/1983 | European Pat. Off. |
| 2233118 | 1/1991 | United Kingdom |

OTHER PUBLICATIONS

*Patent Abstracts of Japan*, vol. 15, No. 314 (M-1145) Aug. 12, 1991 corresponding to JP-A-03 117 306 (Hitachi LTD) May 20, 1991.

*Patent Abstracts of Japan*, vol. 15, No. 414 (M-1171) Oct. 22, 1991 corresponding to JP-A-03 173 303 (Toshiba Corp.) Jul. 26, 1991.

*Patent Abstracts of Japan*, vol. 17, No. 472 (M-1470) Aug. 27, 1993 corresponding to JP-A 05 112 243 (Toshiba Corp) May 7, 1993.

*Patent Abstracts of Japan*, vol. 18, No. 352 (M-1631) Jul. 4, 1994 corresponding to JP-A-06 090 508 (Toshiba Corp) Mar. 29, 1994

*Proceedings of the International Workshop on Artificial Intelligence for Industrial Applications*, May 25, 1988, Hitachi City, Japan, pp. 485–489, Oshima et al., "Operation System Based on Predictive Control".

*Primary Examiner*—Kevin J. Teska
*Assistant Examiner*—Stephen J. Walder, Jr.
*Attorney, Agent, or Firm*—Sughrue,Mion,Zinn,Macpeak & Seas, PLLC

[57] ABSTRACT

The present invention relates to an automatic driver system for a vehicle, the system comprising:
  means for evaluating the switching distance $D_{switch}$;
  means for computing a reference speed $V_{ref}$;
  means for generating a reference acceleration $\gamma_{ref}$;
  means for generating a deceleration reference $\gamma_{brake}$; and
  means for generating a traction command T.

The present invention also relates to a method of generating a reference acceleration.

9 Claims, 2 Drawing Sheets

AUTOMATIC DRIVER SYSTEM AND A METHOD OF GENERATING AN ACCELERATION REFERENCE

The present invention relates in general to systems and methods enabling accurate stops to be processed, e.g. for a rail vehicle, and more particularly it relates to an automatic driver system and to a method of generating an acceleration reference.

BACKGROUND OF THE INVENTION

The article "Design, realization, and improvement of an optimum fuzzy controller for a running train" by N. Geng and I. Muta, published in Japanese Journal of Fuzzy Theory and Systems, Vol. 5, No. 1, 1993, pp. 133 to 146, and the article entitled "Total system for rapid transit and trends in control electronics for railway vehicles" by A. Oazama and M. Nomi, published in Hitachi Review, Vol. 35 (1986), No. 6, pp. 297 to 304, illustrate prior art automatic driver systems for trains.

In the prior art, devices for generating the acceleration reference are based on linear tracking models.

In a first known solution, the acceleration reference is derived directly from the speed of the train and from the present position of the train.

A drawback of that first prior art device for generating the acceleration reference is that it is not possible to ensure that the train stops accurately because the calculation becomes erratic in the vicinity of the stop point.

Another drawback of that first prior art device for generating the acceleration reference is that it does not enable the train to be stopped in predictable time.

Another state of the art solution consists in introducing a standard acceleration reference into the above calculation of the acceleration reference, which standard acceleration reference becomes the acceleration reference on approaching the target point.

A drawback of that other prior art device for generating the acceleration reference is that it does not enable braking time to be controlled.

OBJECTS AND SUMMARY OF THE INVENTION

Thus, an object of the invention is to provide an automatic driver system and a method of generating an acceleration reference that enable a determined stopping time to be obtained while also ensuring good repeatability in stop position.

The invention provides an automatic driver system for a vehicle, comprising:
 means for evaluating the switching distance $D_{switch}$;
 means for computing a reference speed $V_{ref}$;
 means for generating a reference acceleration $\gamma_{ref}$;
 means for generating a deceleration reference $\gamma_{brake}$; and
 means for generating a traction command T.

The automatic driver system of the invention may include a System for processing accurate stops and comprising at least one fuzzy inference system FIS, the fuzzy rules of the fuzzy inference system FIS having the effect, when the train is not close to its target point, of bringing the train onto a predetermined constant deceleration curve.

The automatic driver system of the invention may include a recording of a plurality of standard trajectories corresponding to known vehicle decelerations.

The displacement $D_{switch}$ is estimated using the following equation:

$$D_{switch} = \frac{V_{anticipated}^2}{2\gamma_{brake}} + V_{anticipated} \times (\text{reaction} + Tr)$$

where:
 reaction is the delay due to train reaction time, i.e. the time between the instant a command is given and the beginning of the train reacting to said command;
 Tr is the response time of the vehicle, i.e. the time between the beginning of the train reacting and the end of its reaction for a given command;
 $V_{anticipated}$ is the speed of the vehicle in (reaction+Tr) seconds time; and
 $\gamma_{brake}$ is the standard deceleration when braking into a station.

The invention also provides an automatic vehicle driver system, including means for describing the situation of a vehicle by means of a variable α, said variable α characterizing the position of the train relative to a plurality of standard trajectories corresponding to known decelerations of the vehicle.

The variable α is given by the expression:

$$\alpha = \frac{D_0 - D_{present}}{D_0 - D_2}$$

where:
 $D_0$ is the stop distance of the train if a first standard deceleration $\gamma_0$ is applied, said deceleration is constant and known a priori;
 $D_2$ is the stop distance of the train if a second deceleration $\gamma_2$ is applied, said second deceleration being constant; and
 $D_{present}$ is the distance between the present point and the target point.

The invention also provides a method of generating a reference acceleration for a vehicle in an automatic vehicle driver system, wherein the situation of a vehicle is described by means of a variable α, said variable α characterizing the position of the train relative to a plurality of standard trajectories corresponding to known decelerations of the vehicle.

In this method, the variable is given by the expression:

$$\alpha = \frac{D_0 - D_{present}}{D_0 - D_2}$$

where:
 $D_0$ is the stop distance of the train if a first standard deceleration $\gamma_0$ is applied, said deceleration is constant and known a priori;
 $D_2$ is the stop distance of the train if a second deceleration $\gamma_2$ is applied, said second deceleration being constant; and
 $D_{present}$ is the distance between the present point and the target point.

The accurate stop procedure is triggered when braking at a predetermined standard value applied from the present instant, and taking account of time constants of the vehicle, would give rise to a displacement $D_{switch}$ of the vehicle bringing it to the vicinity of the stop point in the station and not to the target point.

The displacement $D_{switch}$ is estimated by the following equation:

$$D_{switch} = \frac{V^2_{anticipated}}{2\gamma_{brake}} + V_{anticipated} \times (\text{reaction} + Tr)$$

where:

reaction is the delay due to train reaction time, i.e. the time between the instant a command is given and the beginning of the train reacting to said command;

Tr is the response time of the vehicle, i.e. the time between the beginning of the train reacting and the end of its reaction for a given command;

$V_{anticipated}$ is the speed of the vehicle in (reaction+Tr) seconds time; and $\gamma_{brake}$ is the standard deceleration when braking into a station.

An advantage of the automatic driver system and of the method of generating an acceleration reference of the invention is that stopping takes place with an accuracy of about five centimeters in the event of position being reset during the stopping stage.

Another advantage of the automatic driver system and of the method of generating an acceleration reference of the invention is that the braking time is accurate and predictable.

Another advantage of the automatic driver system and the method of generating an acceleration reference of the invention is its insensitivity to changes in the load and the characteristics of the vehicles concerned.

Another advantage of the automatic driver system and the method of generating an acceleration reference of the invention is robustness.

BRIEF DESCRIPTION OF THE DRAWINGS

Other objects, characteristics, and advantages of the invention appear on reading the following description of the preferred embodiment of the system for processing accurate stops, the automatic driver system including such a system, and of the method of generating an acceleration reference in such a system, which description is made with reference to the accompanying drawings, in which.

MORE DETAILED DESCRIPTION

Figure 1:
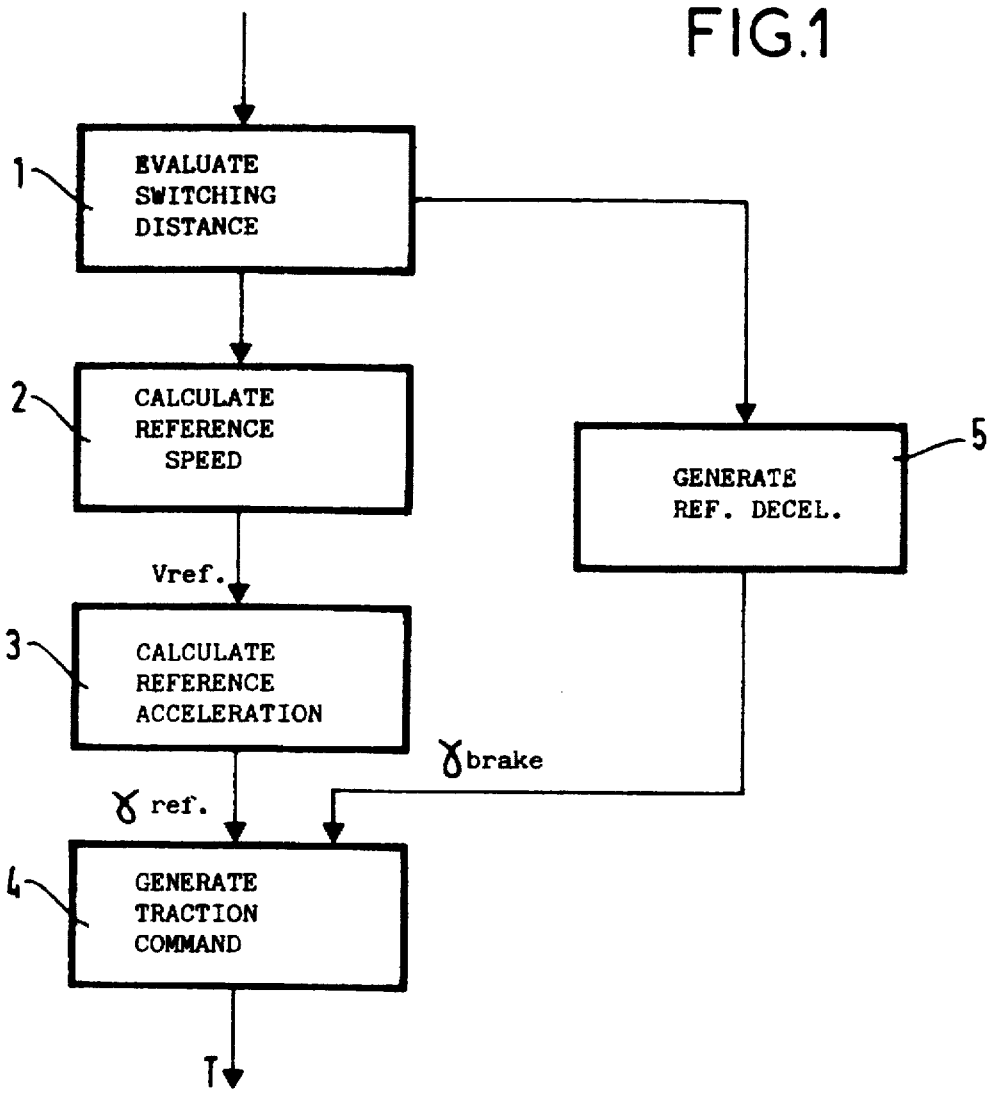
FIG. 1 shows the general architecture of a preferred embodiment of the automatic driver system of the invention.

FIG. 1 shows the general architecture of a preferred embodiment of the automatic driver system of the invention.

From FIG. 1, there can be seen three major steps 2 to 4 for obtaining traction control of the vehicle and two steps 1 and 5 for processing accurate stops and that constitute more particularly the subject matter of the present invention.

A first step 1 corresponds to evaluating a switching distance.

The term "switching distance" is used to mean the distance for triggering the stop procedure. When the remaining travel distance becomes equal to the switching distance, the system described comes into action. This distance is calculated using the following expression:

$$D_{switch} = \frac{V^2_{anticipated}}{2\gamma_{serv.brake}} + V_{anticipated} \times (\text{reaction} + Tr)$$

where:

$$\frac{V^2_{anticipated}}{2\gamma_{serv.brake}}$$

is the distance travelled when the train is running at speed $V_{anticipated}$ and a constant deceleration $\gamma_{serv.brake}$ is applied thereto corresponding to the service braking of the train; and $V_{anticipated} \times (\text{reaction}+Tr)$ is the distance travelled by the train during the time taken for the command to propagate assuming that the decision to switch is taken at the present instant.

This step 1 serves to launch the procedure for processing accurate stops.

This processing of accurate stops includes a fifth step 5 corresponding to generating a deceleration reference $\gamma_{brake}$.

This processing takes account of the criterion of positioning resetting robustness.

The term "position resetting robustness" is used to designate the suitability of the system for absorbing updates on the distance to the target point that are performed on approaching the station, e.g. by means of ground beacons. The beacons serve to correct information concerning the distance that remains to be travelled. This information as given by onboard sensors, for example, may be very different from the real distance, e.g. because of measurement noise. Such resetting gives rise to greatly degraded performance in state of the art solutions.

A second step 2 corresponds to calculating a reference speed $V_{ref}$

These calculations take account of data such as travel time management, catching up lateness, energy optimization, and servo-control for slowing down.

A third step 3 corresponds to generating a reference acceleration $\gamma_{ref}$ This step does not take account of constraints on acceleration.

A fourth step 4 corresponds to generating a traction command T.

This step takes account of the robustness to variations in load and to speed measurements.

The position and the speed of the vehicle, and also orders to slow down are items of information that are provided to the vehicle while it is travelling.

Conversely, the reference concerning travel time to the next station, the profile of the track, points that need to be protected, standard working, and the characteristics of the train, are all items of information that are provided either in a station, or else are transmitted by ground equipment, or else are stored in the memory of the automatic driver system.

In the automatic driver system of the invention, steps 1 and 5 are processed by "fuzzy inference" systems associated with non-fuzzy logic systems.

Steps 2 to 4 may be performed by systems known in conventional automation or, preferably, they may be processed by systems that likewise make use of fuzzy inference and that are associated with non-fuzzy logic systems.

The fuzzy inference systems that are preferably used in the automatic driver system of the invention are of the Sugeno type.

The conclusion of rules is a linear combination of input values.

An example of the syntax of a fuzzy inference system FIS used in the automatic driver system of the invention is given in Table 1.

TABLE 1

```
/* Definition of variables */
input variable    a   0   5;
input variable    b   0   1;
control variable  c   0   1    sugeno;
/* Definition of fuzzy sets */
a small triangle  0   0   5;
a large triangle  0   5   5;
b small triangle  0   0   1;
b large triangle  0   1   1;
/* Definition of fuzzy rules */
rule r1 if a is small and b is small    then c is 1 2 3;
rule r2 if a is large and b is small    then c is 1 0 0;
```

The definition of variables gives a list of input and output variables in the fuzzy inference system and their respective ranges of variation.

The definition of fuzzy sets gives the list of fuzzy sets for each variable, their type, and their characteristic parameters.

Figure 2:
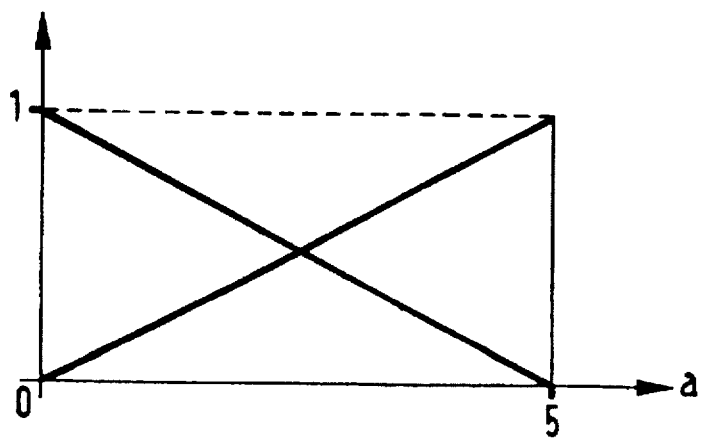
FIG. 2 shows a fuzzy set of the triangle type defined by the abcissas of three vertices of a triangle.

For example, a triangle type fuzzy set is defined by the abscissa of each of three vertices of a triangle. Such a triangle is shown in FIG. 2.

The definition of rules gives a list of applicable fuzzy rules.

Rule r1 should be interpreted as follows:

When a and b satisfy the premises of the rule, then c=1+2a+3b.

If the output list is reduced to a single value, then the conclusion of the rule takes this value directly.

The processing of accurate stops constitutes a particular problem in automatic driver methods and devices.

The object is to bring the train to an accurate location, referred to as the "target point", and at a determined speed (zero) while nevertheless satisfying travel time constraints.

In order to improve the processing of accurate stops, the braking stage has been split into two portions.

In a first portion, the looked-for object is to achieve standard deceleration as quickly as possible in order to comply as closely as possible to constant braking duration.

During a second stage, the main object is to stop exactly at the target point.

The accurate stop procedure is triggered when braking at a predetermined standard value and applied from the present instant while taking account of time constants for the train (lateness and response time), would give rise to displacement of the train that would bring it to the vicinity of the stop point in the station, and not to the target point.

This displacement $D_{switch}$ is estimated from the following equation:

$$D_{switch} = \frac{V^2_{anticipated}}{2\gamma_{brake}} + V_{anticipated} \times (\text{reaction} + Tr)$$

where:

reaction is the delay due to train reaction time, i.e. the time between the instant a command is given and the beginning of the train reacting to said command;

Tr is the response time of the vehicle, i.e. the time between the beginning of the train reacting and the end of its reaction for a given command;

$V_{anticipated}$ is the speed of the vehicle in (reaction+Tr) seconds time; and $\gamma_{brake}$ is the standard deceleration when braking into a station.

So long as the switching distance $D_{switch}$ as generated is less than the distance to the target point, general processing is applied.

Anticipation is performed over one second, which is of the same order of magnitude as the pure reaction time.

$$V_{anticipated} = V_{present} + \gamma_{present} \times \text{reaction}$$

$$X_{anticipated} = X_{present} + \frac{1}{2}(V_{present} + V_{anticipated}) \times \text{reaction}$$

where:

$V_{anticipated}$ corresponds to the speed of the train in "reaction" time seconds given that in the corresponding time interval acceleration cannot be changed by the command. It is assumed that outside influences are negligible over such a short duration;

$X_{anticipated}$ is the position of the train in "reaction" time seconds. Given that speed varies as a function of the acceleration $\gamma_{present}$, the average of the present speed and of the anticipated speed is used in order to obtain the new position.

The standard deceleration for braking is set at 0.7 m/s². It corresponds to the value of $\gamma_{serv.brake}$ as used when calculating $D_{switch}$.

Figure 3:
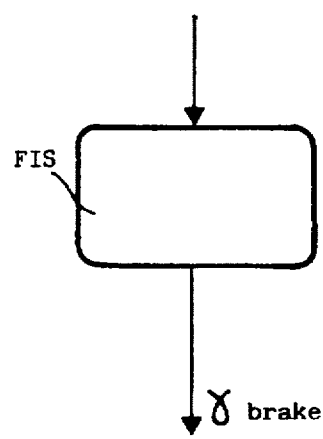
FIG. 3 is a diagram showing how a preferred embodiment of the accurate stop processing system of the invention operates.

FIG. 3 is a diagram showing how a preferred embodiment of the system of the invention for processing accurate stops operates.

The system of the invention for processing accurate stops comprises a branch including a fuzzy inference system FIS.

By way of example, Table 2 shows one possible syntax for the fuzzy inference system FIS used in processing accurate stops.

TABLE 2

```
/* Definition of variables */
input variable    alpha   -1   1.5;
input variable    dist     0    50;
control variable  acc     -1    1     sugeno;
/* Definition of fuzzy sets */
alpha very far    trapezium   -1      -1     -0.5;    0;
alpha far         trapezium   -0.5     0      0.2;    0.771;
alpha spot-on     triangle     0.2     0.771  1;
alpha close       triangle     0.771   1      1.5;
alpha very close  triangle     0.771   1.5    1.5;
dist very close   triangle     0       0     15;
dist close        trapezium    0       0     15;      50;
dist far          triangle    15      50     50;
/* Definition of fuzzy rules */
rule r0  if alpha is very far and dist is far
                                          then acc is 0;
rule r1  if alpha is far and dist is far
                                          then acc is -0.2;
rule r2  if alpha is spot-on and dist is far
                                          then acc is -0.7;
rule r3  if alpha is close and dist is far
                                          then acc is -1;
rule r10 if alpha is very far and dist is close
                                          then acc is 0;
rule r11 if alpha is far and dist is close
                                          then acc is -0.37;
rule r12 if alpha is spot-on and dist is close
                                          then acc is -0.7;
rule r13 if alpha is close and dist is close
                                          then acc is -0.93;
rule r00 if alpha is very far and dist is very close
                                          then acc is -0.95;
```

The inputs to the fuzzy inference system FIS of the system for processing accurate stops are the following:

a parameter α indicating the situation of the train; and the distance D to the target point.

The output from the fuzzy inference system FIS is the deceleration $\gamma_{brake}$ to be applied to ensure an accurate stop.

Accurate stop processing in accordance with the invention consists in positioning the (speed-position) phase trajectory 7 relative to various standard trajectories 8 to 10 corresponding to known decelerations, and causing said trajectories to vary in flexible manner.

Figure 4:
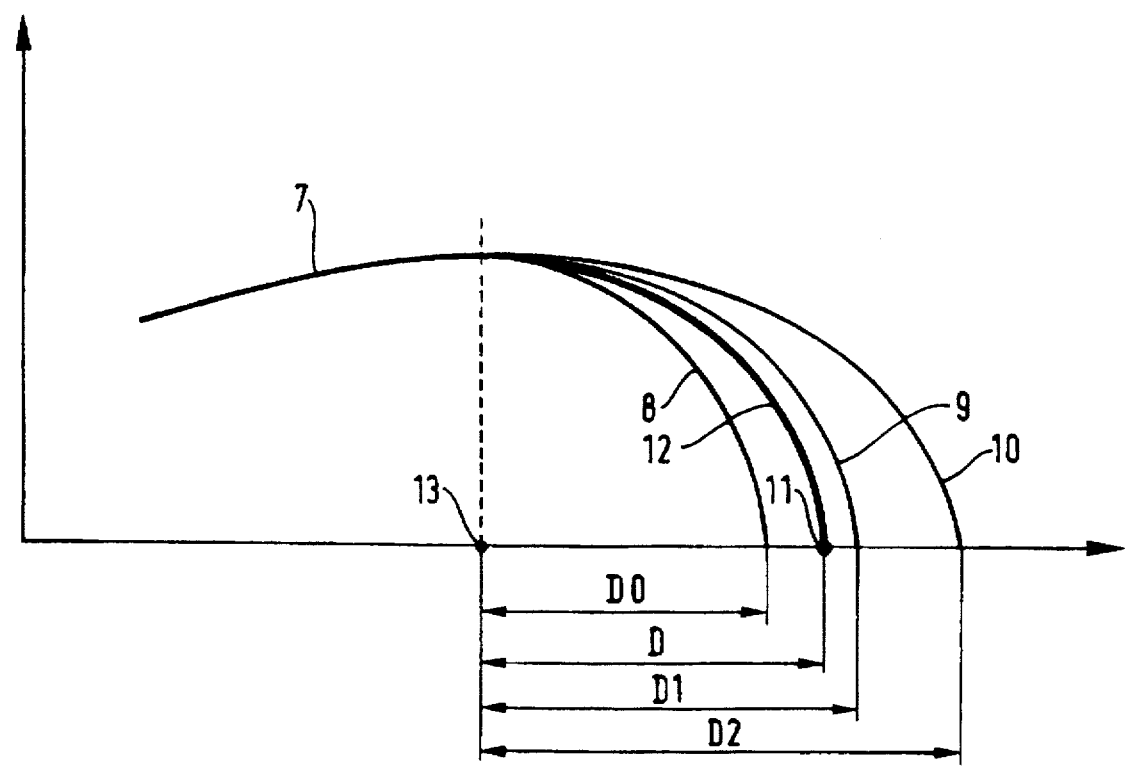
FIG. 4 shows the standard phase trajectories used while processing accurate stops and in accordance with the invention.

FIG. 4 illustrates the standard trajectories 8 to 10.

The fuzzy inference system FIS determines a deceleration reference $\gamma_{brake}$ to bring the train to a standstill at the target point 11 with the best possible accuracy and without overshoot.

In FIG. 4, the point marked 13 indicates the position of the train at which the accurate stop procedure is triggered.

When the train is not close to the target point, the fuzzy rules given above have the effect of putting the train on a predetermined constant deceleration curve 12 as quickly as possible and flexibly so as to control the duration D of the braking stage.

As the train approaches the target point 11, the fuzzy rules used tend to give precedence to stop accuracy by servo-controlling position, to the detriment of servo-controlling constant deceleration.

The situation of the train is given by computing a parameter α enabling the train to be positioned relative to the standard deceleration curves 8 to 10.

The parameter α is given by the following expression:

$$\alpha = \frac{D_0 - D_{present}}{D_0 - D_2}$$

where:

$D_0$ is the stop distance of the train if a first standard deceleration $\gamma_0$ is applied, said deceleration is constant and known a priori;

$D_2$ is the stop distance of the train if a second deceleration $\gamma_2$ is applied, said second deceleration being constant; and $D_{present}$ is the distance between the present point and the target point.

We claim:

1. An automatic driver system for a vehicle, the stem comprising:

means for evaluating a switching distance;

means, responsive to said switching distance evaluating means, for computing a reference speed $V_{ref}$;

means, responsive to said speed computing means, for generating a reference acceleration $\gamma_{ref}$;

means, responsive to said switching distance evaluating means, for generating a deceleration reference $\gamma_{brake}$; and means, responsive to said deceleration and acceleration generating means, for generating a traction command T.

2. An automatic vehicle driver system according to claim 1, said system operable to process accurate stops and comprising at least one fuzzy inference system FIS, the fuzzy rules of the fuzzy inference system FIS having the effect that when the vehicle is not close to a target point, the vehicle is operated according to a predetermined constant deceleration curve.

3. A system according to claim 2, including recording a plurality of standard trajectories corresponding to known decelerations of the vehicle.

4. A system according to claim 3, in which a displacement $D_{switch}$ is estimated using the following equation:

$$D_{switch} = \frac{V_{anticipated}^2}{2\gamma_{brake}} + V_{anticipated} \times (\text{reaction} + Tr)$$

where reaction is the delay due to vehicle reaction time, i.e. the time between the instant a command is given and the beginning of the vehicle reacting to said command;

Tr is the response time of the vehicle, i.e. the time between the beginning of the vehicle reaction and the end of its reaction for said command;

$V_{anticipated}$ is the speed of the vehicle in (reaction+Tr) seconds; and $\gamma_{brake}$ is the deceleration when braking into the station.

5. A system according to claim 1, in which an accurate stop procedure is triggered when braking at a predetermined standard value applied from a present instant, taking account time constants of the vehicle, would give rise to a displacement $D_{switch}$ of the vehicle bringing it to the vicinity of a stop point in the station but not to a target point.

6. A method according to claim 5, in which the displacement $D_{switch}$ is estimated by the following equation:

$$D_{switch} = \frac{V_{anticipated}^2}{2\gamma_{brake}} + V_{anticipated} \times (\text{reaction} + Tr)$$

where:

reaction is the delay due to vehicle reaction time, i.e. the time between the instant a command is given and the beginning of the vehicle reacting to said command;

Tr is the response time of the vehicle, i.e. the time between the beginning of the vehicle reaction and the end of its reaction to said command;

$V_{anticipated}$ is the speed of the vehicle in (reaction+Tr) seconds time; and $\gamma_{brake}$ is the deceleration when braking into a station.

7. A method of generating a reference acceleration for a vehicle in an automatic driver system according to claim 1, wherein a situation of the vehicle is described a variable α, said variable α characterizing a position of the vehicle relative to a plurality of standard trajectories corresponding to known decelerations of the vehicle.

8. A method according to claim 7, in which the variable α is given by the expression:

$$\alpha = \frac{D_0 - D_{present}}{D_0 - D_2}$$

where:

$D_0$ is the stop distance of the vehicle if a first standard deceleration $\gamma_0$ is applied, said deceleration is constant and known a priori;

$D_2$ is the stop distance of the vehicle if a second deceleration $\gamma_2$ is applied, said second deceleration being constant; and $D_{present}$ is the distance between a present point and a target stop point.

9. An automatic vehicle driver system, including means for describing the situation of a vehicle by means of a variable α, said variable α characterizing a position of the vehicle relative to a plurality of standard trajectories corresponding to known decelerations of the vehicle, in which the variable α is given by the expression:

$$\alpha = \frac{D_0 - D_{present}}{D_0 - D_2}$$

where $D_0$ is the stop distance of the vehicle if a first standard deceleration $\gamma_0$ is applied, said deceleration is constant and known a priori;

$D_2$ is the stop distance of the vehicle if a second deceleration $\gamma_2$ is applied, said second deceleration being constant; and $D_{present}$ is the distance between a present point and a target stop point.

\* \* \* \* \*